(12) United States Patent
Tani et al.

(10) Patent No.: US 7,009,021 B2
(45) Date of Patent: Mar. 7, 2006

(54) PAINT COMPOSITION, PROCES FOR PRODUCING WEAR-RESISTANT COATING FILM USING THE SAME, AND WEAR-RESISTANT COATING FILM COMPRISING THE SAME

(75) Inventors: Masaaki Tani, Nagoya (JP); Yoshiaki Fukushima, Aichi-ken (JP); Toshihisa Shimo, Kariya (JP); Hitotoshi Murase, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 131 days.

(21) Appl. No.: 10/629,016

(22) Filed: Jul. 29, 2003

(65) Prior Publication Data

US 2004/0022706 A1 Feb. 5, 2004

(30) Foreign Application Priority Data

Aug. 5, 2002 (JP) .............................. 2002-227787

(51) Int. Cl.
*C08G 77/02* (2006.01)
(52) U.S. Cl. .......................... 528/10; 528/15; 528/17; 528/18; 428/412; 428/446
(58) Field of Classification Search .................. 528/10, 528/15, 17, 18; 428/446, 412; 522/1
See application file for complete search history.

(56) References Cited

U.S. PATENT DOCUMENTS 5,527,871 A 6/1996 Tani et al. ..................... 528/10
5,756,628 A * 5/1998 Tani et al. ..................... 528/9

FOREIGN PATENT DOCUMENTS

| EP | 0 233 355 | 8/1987 |
|---|---|---|
| JP | 62-195061 | 8/1987 |
| JP | 3-199118 | 8/1991 |
| JP | 6-200034 | 7/1994 |
| JP | 7-126396 | 5/1995 |
| JP | 8-238683 | 9/1996 |
| JP | 9-241380 | 9/1997 |

\* cited by examiner

*Primary Examiner*—Melanie Bissett
(74) *Attorney, Agent, or Firm*—Morgan & Finnegan, LLP

(57) ABSTRACT

A paint composition includes a layer organic-inorganic composite, and titanium alkoxide in an amount of from 1 to 50 parts by weight with respect to the layer organic-inorganic composite taken as 100 parts by weight. The layer organic-inorganic composite is composed of a laminated substance. The laminated substance includes a tetrahedral structural layer and an octahedral structural layer. The tetrahedral structural layer is made of tetrahedral structures whose central atom M' is Si or a first metallic atom substituting for a part the Si, at least a part of the central atom M' covalent-bonded to an organic group R involving or free from a polymerizable functional group. The octahedral structural layer is made of octahedral structures whose central atom M is a second metallic atom.

20 Claims, 2 Drawing Sheets

PAINT COMPOSITION, PROCES FOR PRODUCING WEAR-RESISTANT COATING FILM USING THE SAME, AND WEAR-RESISTANT COATING FILM COMPRISING THE SAME

BACKGROUND OF THE INVENTION

1. Field of the Invention

The present invention relates to a paint composition whose storage stability is high. Moreover, it relates to a wear-resistant coating film which uses the paint composition and is good in terms of the adherence, and a process for producing the wear-resistant coating film.

2. Description of the Related Art

Plastic materials are lightweight, can be formed with ease, and are good in terms of the shock-resistance and transparency. Accordingly, they offer a wide range of applications. However, since they are likely to be damaged by wear, they lose the glossiness and transparency in service. Hence, as a method for reforming the surface of plastic materials, it has been carried out forming coating films on the surface of plastic materials by treating with hard coating agents. Among the hard coating agents, silicone hard coating paints containing a variety of silicone compounds have been well known.

Many silicone hard coating paints have been developed so far. For example, Japanese Unexamined Patent Publication (KOKAI) No. 8-238,683 discloses a hard coating agent in which a silane compound and/or the hydrolyzed products serve as a binder, and which contains surface-coated fine particles of titanium oxide and aluminum perchlorate. Moreover, Japanese Unexamined Patent Publication (KOKAI) No. 62-195,061 discloses a primer which is produced by co-polymerizing titanium alkoxide and a silane compound.

However, when silicone hard coating paints are produced by partially hydrolyzing silane compounds or metallic alkoxides and condensing them by dehydration to synthesize oligomers with appropriate sizes, it is difficult to inhibit the resulting oligomers from growing furthermore. Accordingly, the oligomers grow with time to such a size that they are not applicable to paints. Thus, conventional silicone hard coating paints generally exhibit poor storage stability. Moreover, when metallic alkoxides are hydrolyzed and condensed by dehydration, the hydrolysis and dehydration condensation accompanies dealcoholization. However, since the resulting alcohols have a non-negligible volume with respect to molecules making paints, they cause the cure shrinkage which sharply reduces the volume of paints after curing, and are accordingly the causes of come-off or cracked paint films. The cure shrinkage occurs remarkably when the thickness of paint films is thicker. On the contrarily, when the thickness of paint films is thinner, paint films have a problem with the strength.

Moreover, Japanese Unexamined Patent Publication (KOKAI) No. 6-200,034, Japanese Unexamined Patent Publication (KOKAI) No. 7-126,396 and Japanese Unexamined Patent Publication (KOKAI) No. 9-241,380 disclose layer organic-inorganic composites. The layer organic-inorganic composites can be used as coating materials, and have the characteristics of inorganic materials and organic materials simultaneously. However, since layer organic silicone polymers are cured by reacting and bonding organic functional groups, the coating materials are limited in view of the hardness.

SUMMARY OF THE INVENTION

It is therefore an object of the present invention to provide a paint composition whose storage stability is high, a wear-resistant coating film using the paint composition, and a process for producing the wear-resistant coating film.

It is naturally possible to apply a paint composition according to the present invention to coating films on plastic materials. Moreover, when the present paint composition is coated on engineering plastics to form wear-resistant coating films, the resulting wear-resistant coating films exhibit high strength, are lightweight and are good in terms of the wear resistance. Accordingly, it is possible to apply the engineering plastics coated with the wear-resistant coating films to automobile sunroofs and housing materials as substitutes for inorganic glass.

The inventors of the present invention thought of strengthening the mutual bonds between layer organic-inorganic composites not only by bonding the layer organic-inorganic composites organically with organic functional groups of the layer organic-inorganic composites but also by further introducing inorganic bonds into the layer organic-inorganic composites. Thus, they arrived at completing the present invention.

The present paint composition comprises:

a layer organic-inorganic composite; and titanium alkoxide in an amount of from 1 to 50 parts by weight with respect to the layer organic-inorganic composite taken as 100 parts by weight;

the layer organic-inorganic composite composed of a laminated substance comprising:

a tetrahedral structural layer made of tetrahedral structures whose central atom M' is Si or a first metallic atom substituting for a part the Si, at least a part of the central atom M' covalent-bonded to an organic group R involving or free from a polymerizable functional group; and an octahedral structural layer made of octahedral structures whose central atom M is a second metallic atom; and the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$.

Accordingly, the layer organic-inorganic composite of the present paint composition does not react of itself even when it coexists with highly reactive metallic alkoxides. Consequently, the present paint composition is extremely stable, and exhibits high storage stability.

In the present paint composition, the first metallic atom substituting for a part of the Si and making the central atom M' can preferably be at least one atom selected from the group consisting of Al, Fe, P and Ti. Moreover, the central atom M can preferably be at least one atom selected from the group consisting of Mg, Al, Ni, Co, Cu, Mn, Fe, Li, V, Zr and Ti.

The present paint composition can preferably further comprise at least one member selected from the group consisting of organic solvents and curing catalysts. Moreover, the present paint composition can preferably further comprise an alkoxy silane compound. In addition, the present paint composition can preferably comprise an organic solvent in an amount of from double to 10 times of the weight of the layer organic-inorganic composite.

The present process for producing a wear-resistant coating film comprises the steps of:

preparing a paint composition comprising: a layer organic-inorganic composite; and titanium alkoxide in an amount of from 1 to 50 parts by weight with respect to the layer organic-inorganic composite taken as 100 parts by weight; the layer organic-inorganic composite composed of a laminated substance comprising: a tetrahedral structural layer made of tetrahedral structures whose central atom M' is Si or a first metallic atom substituting for a part the Si, at least a part of the central atom M' covalent-bonded to an organic group R involving or free from a polymerizable functional group; and an octahedral structural layer made of octahedral structures whose central atom M is a second metallic atom; and the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$;

coating the paint composition on a surface of a resinous substrate; and forming a wear-resistant coating film by giving a physical stimulus to the paint composition to cause the paint composition to react and cure.

In the present production process, the first metallic atom substituting for a part of the Si and making the central atom M' can desirably be at least one atom selected from the group consisting of Al, Fe, P and Ti. Moreover, the central atom M can desirably be at least one atom selected from the group consisting of Mg, Al, Ni, Co, Cu, Mn, Fe, Li, V, Zr and Ti.

In the present production process, the paint composition can desirably further comprise at least one member selected from the group consisting of organic solvents and curing catalysts. Moreover, the paint composition can desirably further comprise an alkoxy silane compound.

In the present production process, the resinous substrate can desirably be composed of polycarbonate.

In the present production process, the physical stimulus can desirably be at least one stimulus selected from the group consisting of heating and emitting ultraviolet rays. Note that the physical stimulus causes the paint composition to react and cure.

The present wear-resistant coating film comprises:

a paint composition coated on a surface of a resinous substrate, and comprising:
  a layer organic-inorganic composite; and
  titanium alkoxide in an amount of from 1 to 50 parts by weight with respect to the layer organic-inorganic composite taken as 100 parts by weight;
  the layer organic-inorganic composite composed of a laminated substance comprising:
    a tetrahedral structural layer made of tetrahedral structures whose central atom M' is Si or a first metallic atom substituting for a part the Si, at least a part of the central atom M' covalent-bonded to an organic group R involving or free from a polymerizable functional group; and
    an octahedral structural layer made of octahedral structures whose central atom M is a second metallic atom; and
  the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$; and the present wear-resistant coating film further comprises:

organic cross-links formed by polymerization of the polymerizable functional groups of the layer organic-inorganic composite and the polymerizable functional groups of the other layer organic-inorganic composites neighboring the layer organic-inorganic composite, the polymerization induced by a physical stimulus given to the paint composition; and inorganic cross-links formed by a reaction between the titanium alkoxide, reacted with and bonded to end hydroxide groups of at least one of the tetrahedral structures and octahedral structures of the layer organic-inorganic composite, and the other titanium alkoxides, reacted with and bonded to end hydroxide groups of at least one of the tetrahedral structures and octahedral structures of the other layer organic-inorganic composites neighboring the layer organic-inorganic composite, the reaction induced by the physical stimulus given to the paint composition. Since the layer organic-inorganic composite exhibits configuration anisotropy, it tends to laminate parallel to the resinous substrate. Accordingly, in the present wear-resistant coating film, the cure shrinkage occurs vertically to the resinous substrate. Consequently, the present wear-resistant coating film is highly resistant to coming-off from the resinous substrate as well as cracking, and exhibits high adherence to the resinous substrate. Moreover, the organic cross-links resulting from the polymerizable functional groups and the inorganic cross-links resulting from the titanium alkoxides occur simultaneously when the physical stimulus is given so that the layer organic-inorganic composites are bonded firmly with each other. As result, the present wear-resistant coating film is good in terms of the wear resistance.

In the present wear-resistant coating film, the first metallic atom substituting for a part of the Si and making the central atom M' can preferably be at least one atom selected from the group consisting of Al, Fe, P and Ti. Moreover, the central atom M can preferably be at least one atom selected from the group consisting of Mg, Al, Ni, Co, Cu, Mn, Fe, Li, V, Zr and Ti.

In the present wear-resistant coating film, the paint composition can preferably further comprise at least one member selected from the group consisting of organic solvents and curing catalysts. Moreover, the paint composition can preferably further comprise an alkoxy silane compound.

In the present wear-resistant coating film, the resinous substrate can preferably be composed of polycarbonate.

In the present wear-resistant coating film, the physical stimulus can preferably be at least one stimulus selected from the group consisting of heating and emitting ultraviolet rays. Note that the physical stimulus causes the paint composition to react and cure.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
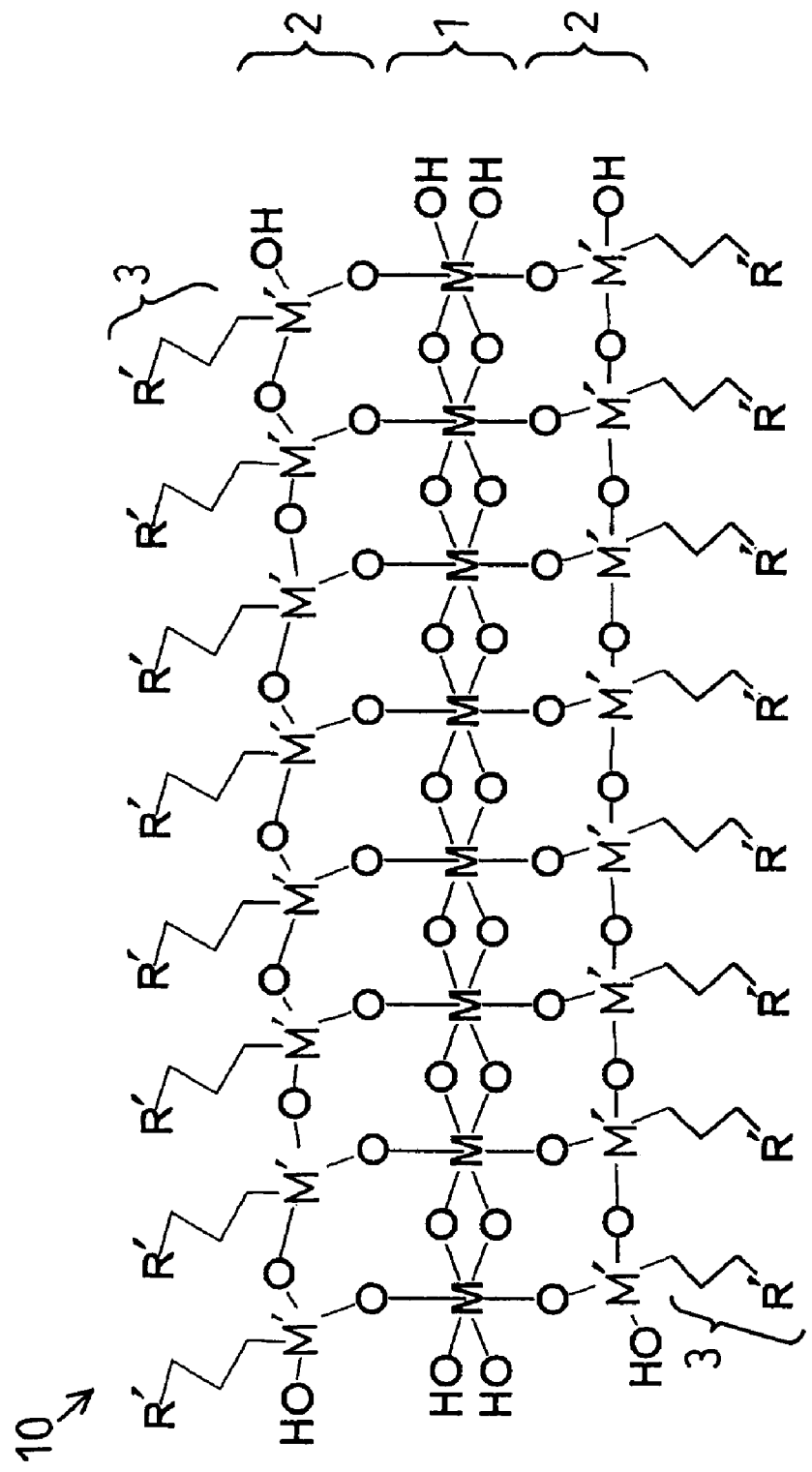
FIG. 1 is a schematic diagram for partially illustrating a structure of a layer organic-inorganic composite according to an example of the present paint composition.

Having generally described the present invention, a further understanding can be obtained by reference to the specific preferred embodiments which are provided herein for the purpose of illustration only and not intended to limit the scope of the appended claims.

Embodiment modes of the present paint composition, the present production process of a wear-resistant coating film and the present wear-resistant coating film comprising the present paint composition will be hereinafter described in more detail with reference to the drawings.

The present paint composition comprises a layer organic-inorganic composite, and titanium alkoxide. The layer organic-inorganic composite is expressed by a general formula, $\{R_n M'O_{(4-n)/2}\}_x (MO_{z/2})(H_2O)_w$, wherein n is an integer of from 1 to 3, x is from 0.5 to 2.0 and is an arbitrary number free of the limitation being an integer, z is the valence number of the central atom M and is an integer of from 2 to 4, and w is the number of crystal water molecules and is an integer falling in a range of from $\{(z/2)-1\}$ to $(z+1)/2$.

The layer organic-inorganic composite is composed of a laminated substance, and an organic group R. The laminated substance comprises a tetrahedral structural layer, and an octahedral structural layer. The tetrahedral structural layer is made of tetrahedral structures. The octahedral structural layer is made of octahedral structures.

The tetrahedral structural layer is made of tetrahedral structures whose central atom M' is Si or a first metallic atom substituting for a part the Si. The first metallic atom substituting for a part the Si can preferably be at least one atom selected from the group consisting of Al, Fe, P and Ti. It has been well known that Al, Fe, P and Ti substitutes for Si with ease to be a central atom.

The octahedral structural layer is made of octahedral structures whose central atom M is a second metallic atom. The central atom M can preferably be at least one atom selected from the group consisting of Mg, Al, Ni, Co, Cu, Mn, Fe, Li, V, Zr and Ti.

The layer organic-inorganic composite has a structure which is highly developed as a crystalline layer polymer comprising the laminated substance composed of the tetrahedral structural layer and the octahedral structural layer. Accordingly, the layer organic-inorganic composite can favorably show the characteristics of inorganic material such as high hardness and high heat-resistance. Moreover, the organic group R involving or free from a polymerizable functional group is bonded to at least a part of the central atom M'. Consequently, it is possible to introduce the organic group R into the layer organic-inorganic composite in such a sufficient quantity of from 1 to 3 organic groups R with respect to one central atom M'. Therefore, it is possible to secure the characteristics of organic material such as flexibility and quick film formability at ordinary or room temperature when the layer organic-inorganic composite is used as paints, for example. In addition, since the organic group R is bonded to the central atom M' by covalent bond, the bonding is tough between them. As a result, the bonding between them is hardly impaired when the layer organic-inorganic composite is subjected to a variety of operations, such as mixing with the other components and giving physical stimuli thereto, for actual applications.

The layer organic-inorganic composite is available as a so-called 2:1 structure, and as a so-called 1:1 structure. In the 2:1 structure, tetrahedral structural layers are formed on the opposite sides of an octahedral structural layer. In the 1:1 structure, a tetrahedral structural layer is formed on one of the opposite sides of an octahedral structural layer. When it is desired to include the organic group R in a large quantity in order to show organic material characteristics, or when it is desired to improve the strength of the present paint composite by reacting the organic groups R of the neighboring layer organic-inorganic composites to bond them by cross-linking, it is further preferable to use layer organic-inorganic composites with the 2:1 structure.

As far as the organic group R can be introduced into layer organic-inorganic composites, and as far as it can give the characteristics of organic material to layer organic-inorganic composites, any organic groups can be used as the organic group R. A representative example is alkyl groups. However, the organic group R can further include a polymerizable functional group, such as acrylic groups, methacrylic groups, epoxy groups, amino groups and mercpapto groups, as the end group. The more the organic group R includes the polymerizable functional groups, the more it is possible to firmly connect the neighboring organic-inorganic composites when the organic groups R of the layer organic-inorganic composites are reacted to bond them by cross-linking. Note that, however, the organic group R does not include alkoxy groups in the present specification.

FIG. 1 partially illustrates a structure of a layer organic-inorganic composite 10 according to an example of the present paint composition. As illustrated in FIG. 1, the layer organic-inorganic composite 10 is a 2:1 structure-layer organic-inorganic composite. Namely, tetrahedral structural layers 2 are formed on the opposite sides of an octahedral structural layer 1. The octahedral structural layer 1 is made of octahedral structures whose central atom is M. The tetrahedral structural layers 2 are made of tetrahedral structures whose central atom is M'. Moreover, organic groups R designated with 3 and having a functional end group R' are bonded to the central atoms M' by covalent bond.

The mechanism how the layer organic-inorganic composite is formed has not been cleared yet. However, it is assumed as hereinafter described. When a solution or dispersion in which organoalkoxy silane, having at least an alkoxy group and at least an organic group, and an inorganic salt, organic salt or alkoxide of metal (or the central atom M) are solved or dispersed in a polar solvent is controlled to weak alkalinity, a crystalline structure made of the octahedral structural layer in which the metal is the central atom M grows in advance, and the growth of the crystalline structure is followed by the bonding between the silicon atoms of the organoalkoxy silane and the growing octahedral structural layer by dehydration condensation after the alkoxy groups of the organoalkoxy silane are hydrolyzed. And then, the crystalline structure of the tetrahedral structural layer also grows around the silicone atoms. Therefore, it is believed that, even when the organic group is directly bonded to a part of the tetrahedral structures, the formation of the tetrahedral structural layer follows the formation of the octahedral structural layer so that the layer organic-inorganic composite is formed eventually.

The organoalkoxy silane supplies the central atom M' and the organic group R of the tetrahedral structural layer of the layer organic-inorganic composite, and has at least an alkoxy group and at least an organic group. Note that the alkoxy group is required in order to bond the silicon, the central atom of the tetrahedral structural layer, to the octahedral structural layer. Therefore, it is possible to use not only organoalkoxy silane which has three alkoxy groups and one organic group but also organoalkoxy silane which has one alkoxy group and three organic groups. Namely, the ratio of the alkoxy group with respect to the organic group can be from 3:1 to 1:3 by number.

Note that, if desired, silicon alkoxides can be incorporated into the layer organic-inorganic composite in the same manner as the organoalkoxy silane. Note that silicon alkoxides do not have any organic group. Accordingly, when silicon alkoxides are used together with the organoalkoxy silane in a predetermined ratio with respect to the organoalkoxy silane, it is possible to control the proportion of the organic group R in the layer organic-inorganic composite. Silicon alkoxides herein designate silicon alkoxides having at least one alkoxy group and free from organic groups. For example, it is possible to use silicon alkoxides which have an alkoxy group in a number of from 1 to 4.

Moreover, no ion-exchange reactions are utilized in order to introduce the organic group R into the layer organic-inorganic composite. Accordingly, it is possible to introduce organic substances which are difficult to ionize, such as organic substances including epoxy groups and organic substances having amino groups as an end group, for example, into the layer organic-inorganic composite as the organic group R. In addition, when a process similar to the production process of phyllosilicate set forth in Japanese Unexamined Patent Publication (KOKAI) No. 3-199,118 is employed, the organic group R to be introduced is hardly impaired by high temperatures or extreme pH values. Note the production process of phyllosilicate disclosed in the publication is characterized in that a layer clay mineral is synthesized with ease and under mild conditions.

The metallic inorganic salt, organic salt or alkoxide supplies the central atom M of the octagonal structural layer in the layer organic-inorganic composite. Regarding the type of inorganic acids and organic acids which form the inorganic salt and organic salt with the metal making the central atom M, it is not limited in particular. Concerning the type of alkoxy groups of the metallic alkoxide, it is not limited in particular, either. Apart of the central atom M might substitute for Si which is the central atom M' of the tetragonal structural layer. Moreover, when inorganic salts, organic salts or alkoxides of phosphorous (P) are used, P substitutes for silicon. The substitution is observed in natural clay mineral as well.

A polar solvent is for solving or dispersing the organoalkoxy silane and the inorganic salt, organic salt or alkoxide of metal (or the central atom M) therein. The polar solvent can be at least one member selected from the group consisting of inorganic polar solvents, organic polar solvents, organic acids and inorganic acids, or mixture solvents composed of two or more of them. One of the inorganic polar solvents is water. The organic polar solvents can be alcohols and acetones. The polar solvent can further preferably be organic solvents soluble in water, such as lower alcohols and acetones.

When the ratio of the using amount of the organoalkoxy silane with respect to the using amount of the inorganic salt, organic salt or alkoxide of metal (or the central atom M) is controlled, it is possible to selectively produce 2:1 or 1:1 structure-layer organic-inorganic composites. In short, it is the issue of the equivalent ratio of the metallic atom making the central atom M of the octahedral structural layer with respect to the silicon atom making the central atom M' of the tetragonal structural layer. For example, when the ratio of the central atom M with respect to the central atom M', i.e., central atom M: the central atom M' is from 1:0.5 to 1:1, 1:1 structure-layer organic-inorganic composites generate. On the other hand, when the ratio, central atom M: the central atom M', is from 1:2 to 3:4, 2:1 structure-layer organic-inorganic composites generate.

Note that, in tetrahedral structures, it has been known that a part of Si—OH always remains uncondensed therein when the alkoxy groups of organoalkoxy silane are hydrolyzed and condensed by dehydration completely. On the other hand, in octahedral structures, all of the oxygen atoms do not necessarily bond to the silicon atoms, depending on the ratio of the silicon atoms with respect to the central atom M of octahedral structures. Accordingly, a part of the oxygen atoms become surplus to exist in the form of M—OH as the hydroxide group. The presence of such a hydroxide group results from the inevitability in order that physical structures exist stably. Moreover, it has been confirmed that the hydroxide group is present in natural phyllosilicate minerals as well.

As described above, the layer organic-inorganic composite can be prepared by hydrolyzing the raw materials completely and completing the following dehydration condensation. The layer organic-inorganic composite is substantially free from water molecules which have the potential of isolating in its own structure. Accordingly, even when the layer organic-inorganic composite coexists with highly reactive metallic alkoxides in paint compositions, it does no react of itself and is extremely stable. Consequently, the paint composition exhibits high storage stability.

As for the organoalkoxy silane, it is possible to name the following, for example, β-acryloxy ethyl trimethoxy silane, β-acryloxy propyl trimethoxy silane, γ-acryloxy ethyl trimethoxy silane, γ-acryloxy propyl trimethoxy silane, β-acryloxy ethyl triethoxy silane, β-acryloxy propyl triethoxy silane, γ-acryloxy ethyl triethoxy silane, γ-acryloxy propyl triethoxy silane, β-methacryloxy ethyl trimethoxy silane, β-methacryloxy propyl trimethoxy silane, γ-methacryloxy ethyl trimethoxy silane, γ-methacryloxy propyl trimethoxy silane, β-methacryloxy ethyl triethoxy silane, β-methacryloxy propyl triethoxy silane, γ-methacryloxy ethyl triethoxy silane, γ-methacryloxy propyl triethoxy silane, vinyl trimethoxy silane, and vinyl triethoxy silane. As for the metallic salt or alkoxide, it is possible to name the following, for instance, magnesium chloride, magnesium chloride hexahydrate, magnesium acetate, aluminum chloride, aluminum chloride hexahydrate, aluminum nitrate, aluminum nitrate nanohydrate, titanium tetraethoxide, titanium tetraisopropoxide, titanium tetra-n-propoxide, and titanium tetarbutoxide. Hence, the layer organic-inorganic composite can preferably be acrylic Mg layer polymers, methacrylic Mg layer polymers, vinyl Mg layer polymers, acrylic Al layer polymers, methacrylic Al layer polymers, vinyl Al layer polymers, acrylic titanosilicates, methacrylic titanosilicates and vinyl titanosilicates which are synthesized by using the organoalkoxy silanes and the metallic salts or alkoxides as set forth above. In particular, when layer organic titanosilicates whose central atom M is Ti are used as the layer organic-inorganic composite, the resulting paint compositions can be turned into coating films which exhibit an ability of shutting off ultraviolet rays in addition to good wear resistance.

The titanium alkoxide making the present paint composition is mixed in a proportion of from 1 to 50 parts by weight with respect to the layer organic-inorganic composite taken as 100 parts by weight. Note that the proportion depends on the size of the alkoxide group in the titanium alkoxide. The proportion of the titanium alkoxide can preferably be from 5 to 25 parts by weight with respect to the layer organic-inorganic composite taken as 100 parts by weight. When the proportion of the titanium alkoxide is less than 5 parts by weight, the titanium alkoxide induces the inorganic cross-links less. Accordingly, there arises a problem that the resulting layer organic-inorganic composites cannot be connected firmly with each other. Moreover, when the proportion of the titanium alkoxide is 1 part by weight or less, the problem occurs more remarkably. On the other hand, when the proportion of the titanium alkoxide exceeds 25 parts by weight, the titanium alkoxide is present too much to neglect the volumetric decrement by dealcoholization because the bonding reaction of titanium alkoxide is accompanied by dealcoholization. As a result, the shrinkage of the resulting paint films enlarges so that the resulting products might warp and the resulting paint films might crack or come off from substrates. Moreover, when the proportion of the titanium alkoxide is beyond 50 part by weight, the shrinkage problem occurs more remarkably. The titanium alkoxide is not limited in particular as far as it has an alkoxy group which can bond to an hydroxide group possessed by the layer organic-inorganic composite to form a cross-link by condensation. For example, the titanium alkoxide can be titanium tetramethoxide, titanium tetraethoxide, titanium tetra-isopropoxide, titanium tetra-n-propoxide, titanium tetra-n-butoxide, titanium tetraisobutoxide, and titanium tetra-t-butoxide. The titanium alkoxide can preferably be titanium tetraisopropoxide or titanium tetra-n-butoxide.

In addition, the present paint composition can preferably further comprise an organic solvent and/or a curing catalyst.

When the titanium alkoxide making the present paint composition is mixed with the layer organic-inorganic composite, the present paint composition can be formed as pastes because the titanium alkoxide is liquid. However, in order to produce smoother coating films, it is preferred that an organic solvent can be further added to the present paint composition. In this instance, it is preferred that the present paint composition can comprise an organic solvent in an amount of from double to 10 times, further preferably from 3 to 8 times of the weight of the layer organic-inorganic composite. When the proportion of the organic solvent does not fall in the range, it is difficult to disperse the layer organic-inorganic composite in the organic solvent, or it is difficult to smoothly form paint films after the resulting paint compositions are coated. The organic solvent is not limited in particular as far as it can disperse the layer organic-inorganic composite therein. The organic solvent can preferably be those whose water content is 0.5% by weight or less, and can further preferably be those free from water. For example, the organic solvent can be alcohols, alcohol derivatives, ketones, monomers, and general organic solvents. The alcohols can be 1-propanol, 2-propanol, and n-butanol. The alcohol derivatives can be 2-ethoxy ethanol, 2-butoxy ethanol, 1-methoxy-2-propanol, and 1-butoxy-2-propanol. The ketones can be methyl ethyl ketone, methyl isobuthyl ketone, di-acetone alcohol, 4-hydroxy-4-methyl-2-pentanone. The monomers can be stylene, 2-hydroxy ethyl acrylate, 2-hydroxy ethyl methacrylate, 2-hydroxy propyl acrylate, 2-hydroxy propyl methacrylate, and tetra-hydroxy furfuryl acrylate. The general organic solvents can be toluene, and xylene. In the present paint composition, it is especially preferable to use the alcohol derivatives, such as 1-methoxy-2-propanol and 1-butoxy-2-propanol, as the organic solvent.

If necessary, the curing catalyst can be selected from curing catalysts which are appropriate for the specific curing conditions of the present paint composition. The curing catalyst can preferably be radical initiators. For example, the radical initiators can be benzophenone, benzoin methyl ether, benzoin ethyl ether, benzoin isopropyl ether, benzoin isobutyl ether, 2-hydroxy-2-methyl-1-phenyl-1-propanone, 2,2-diethoxyacetophenone, 2,2-dimethoxy-2-phenyl acetophenone, 2-chlorothio xhantone, 1-hydroxy cyclohexyl phenyl ketone, 2-methyl-1-phenyl-2-propanol ($\alpha$, $\alpha'$-dimethyl-$\beta$-phenyl ethyl alcohol), methyl phenyl glyoxylate, and ethyl phenyl glyoxylate.

Moreover, the present paint composition can preferably further comprise an alkoxy silane compound. The alkoxy silane compound is added in order to control the inorganic cross-linking reaction induced by the titanium alkoxide, and to adjust the flexibility of coating films resulting from the present paint composition. The alkoxy silane compound can preferably be added in an amount equal to or less than that of the titanium alkoxide. The curing of paint films are completed when paint films are irradiated with ultraviolet rays. However, in order to react the titanium alkoxide with and bond it to the layer organic-inorganic composite, it is not necessarily required to irradiate the paint composition with ultraviolet rays. When products with the present paint composition applied are irradiated with ultraviolet rays, they are heated secondarily. It is believed that the secondary heating facilitates the titanium alkoxide to react with and bond it to the layer organic-inorganic composite. Ideally, it is believed most preferable that the titanium alkoxide can develop the cross-linking with the layer organic-inorganic composite simultaneously with the reaction and bonding of the organic groups R, possessed by the layer organic-inorganic composite, when the present paint composition is irradiated with ultraviolet rays. However, the titanium alkoxide exhibits relatively high reactivity, and is likely to be hydrolyzed at room temperature by water contained in air and to be further condensed by dehydration. Accordingly, paint compositions comprising the layer organic-inorganic composite and the titanium alkoxide might not react to form the cross-links ideally as described above at room temperature by moistures in actual manufacturing processes. If such is the case, tetra-functional or tri-functional alkoxy silane compounds, which exhibit a slower hydrolysis rate than that of the titanium alkoxide, can be added to the present paint composition as a retardant, and thereby it is possible to control the reaction.

Thetetra-functional alkoxy silane compounds can preferably be tetra-functional silanes such as tetramethoxy silane and tetraethoxysilane. The tri-functional alkoxysilane compounds can be tri-functional silanes which have vinyl groups, acrylic groups or methacrylic groups. For example, the tri-funtional silanes can be $\beta$-acryloxy ethyl trimethoxy silane, $\beta$-acryloxy propyl trimethoxy silane, $\gamma$-acryloxy ethyl trimethoxy silane, $\gamma$-acryloxy propyl trimethoxy silane, $\beta$-acryloxy ethyl triethoxy silane, $\beta$-acryloxy propyl triethoxy silane, $\gamma$-acryloxy ethyl triethoxy silane, $\gamma$-acryloxy propyl triethoxy silane, $\beta$-methacryloxy ethyl trimethoxy silane, $\beta$-methacryloxy propyl trimethoxy silane, $\gamma$-methacryloxy ethyl trimethoxy silane, $\gamma$-methacryloxy propyl trimethoxy silane, $\beta$-methacryloxy ethyl triethoxy silane, $\beta$-methacryloxy propyl triethoxy silane, $\gamma$-methacryloxy ethyl triethoxy silane, $\gamma$-methacryloxy propyl triethoxy silane, vinyl trimethoxy silane, and vinyl triethoxy silane. In order to give flexibility to coating films resulting from the present paint composition, it is effective to add alkyl trialkoxy silane $C_nH_{2n+1}Si(OC_mH_{2m+1})_3$. However, the addition of the alkyl trialkoxy silane can preferably be suppressed to 20 parts by weight or less with respect to the titanium alkoxide taken as 100 parts by weight.

The present production process of a wear-resistant paint film comprises the steps of:
preparing a paint composition comprising:
a layer organic-inorganic composite; and
titanium alkoxide in an amount of from 1 to 50 parts by weight with respect to the layer organic-inorganic composite taken as 100 parts by weight;
coating the paint composition on a surface of a resinous substrate; and
forming a wear-resistant coating film by giving a physical stimulus to the paint composition to cause the paint composition to react and cure.

The paint composition prepared in the preparing step is identical with the present paint composition.

In the coating step, the paint composition obtained in the preparing step is coated on a surface of a resinous substrate. The resinous substrate can desirably comprise engineering plastics which exhibit good mechanical characteristics as well as heat resistance and durability. Specifically, the engineering plastics can be polycarbonate, polyacetal, polyamide, polymethyl methacrylate, and polymethyl acrylate. Several coating methods are available for coating the paint composition on a surface of the resinous substrate, however, it is desirable to use a flow coating method. In addition, it is possible to use an applying method, a spin coating method, a spraying method, and a dip coating method.

In the curing step, a physical stimulus is given to the paint composition to cause the paint composition to react and cure, thereby forming a wear-resistant coating film. When an organic solvent is further included in the paint composition, the organic solvent is first removed by simply holding the resinous substrate with the paint composition coated at room temperature, or by heating it. Thereafter, a physical stimulus is given to the paint composition to cause the paint composition to react and cure. The physical stimulus can desirably be heating or emitting ultraviolet rays.

The present wear-resistant coating film comprises:
a paint composition coated on a surface of a resinous substrate, and comprising:
a layer organic-inorganic composite; and
titanium alkoxide in an amount of from 1 to 50 parts by weight with respect to the layer organic-inorganic composite taken as 100 parts by weight; and
the present wear-resistant coating film further comprises:
organic cross-links formed by polymerization of the polymerizable functional groups of the layer organic-inorganic composite and the polymerizable functional groups of the other layer organic-inorganic composites neighboring the layer organic-inorganic composite, the polymerization induced by a physical stimulus given to the paint composition; and
inorganic cross-links formed by a reaction between the titanium alkoxide, reacted with and bonded to end hydroxide groups of at least one of the tetrahedral structures and octahedral structures of the layer organic-inorganic composite, and the other titanium alkoxides, reacted with and bonded to end hydroxide groups of at least one of the tetrahedral structures and octahedral structures of the other layer organic-inorganic composites neighboring the layer organic-inorganic composite, the reaction induced by the physical stimulus given to the paint composition.

The present wear-resistant coating film is produced by the present process for producing a wear-resistant coating film. When the present paint composition is subjected to a physical stimulus, the polymerizable functional groups possessed by a layer organic-inorganic composite react with the polymerizable functional groups possessed by the other layer organic-inorganic composites so that the neighboring layer organic-inorganic composites are cross-linked organically. Simultaneously, heat accompanying the physical stimulus induces the following reactions. The titanium alkoxide bonds to the hydroxide groups which are present in a form of M'—OH and M—OH at the ends of the tetragonal structures and octagonal structures in the layer organic-inorganic composites. Moreover, the neighboring titanium alkoxides, which are bonded to the layer organic-inorganic composites, react with and bond to each other. Accordingly, the layer organic-inorganic composites are cross-linked inorganically. Thus, the organic cross-linking by the polymerizable functional groups and the inorganic cross-linking by the titanium alkoxides occur simultaneously by the physical stimulus so that the layer organic-inorganic composites are connected firmly with each other. Consequently, the paint composition is turned into a coating film with good wear resistance.

Figure 2:
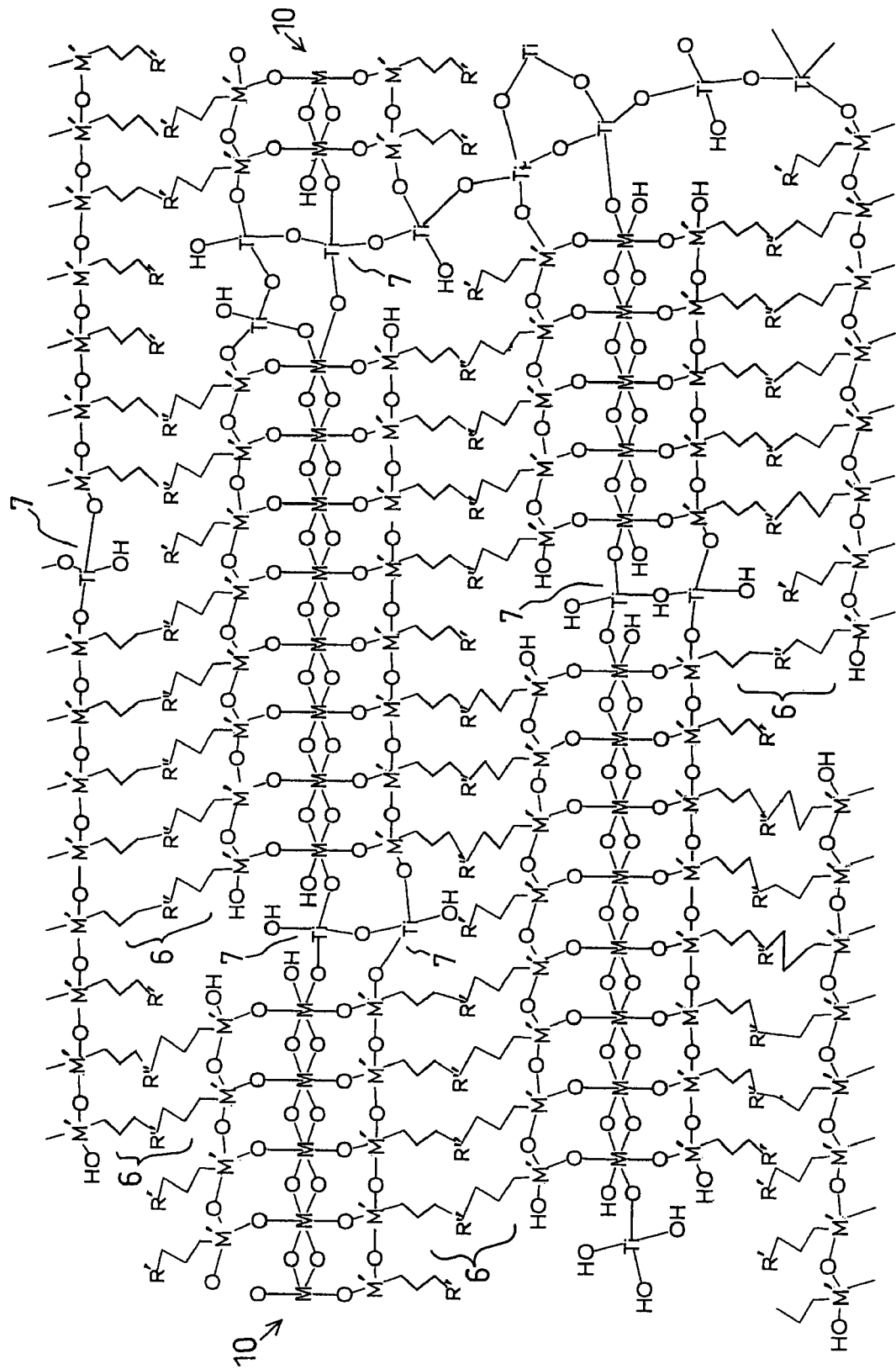
FIG. 2 is a schematic diagram for partially illustrating a structure according to an example of the present wear-resistant coating film.

FIG. 2 partially illustrates a structure according to an example of the present wear-resistant coating film. When a physical stimulus is given to the present paint composition, cross-links 6 by the polymerizable function groups R' and cross-links 7 by the titanium alkoxides are formed simultaneously. As a result, layer organic-inorganic composites 10 are connected firmly with each other. Note that the functional groups R' are turned into functional groups R" after the reaction.

When organic and inorganic cross-links occur in layer organic-inorganic composite materials, the atomic groups are separated and are thereafter recombined. Accordingly, layer organic-inorganic composite materials reduce the volume remarkably to cause the curing shrinkage after they are cured. However, the present paint composition comprises the layer organic-inorganic composite which exhibits configuration anisotropy. Consequently, the layer organic-inorganic composites tend to laminate parallel to the resinous substrate when the paint composition further comprising an organic solvent is formed as sheet shapes by removing the organic solvent. As a result, in the present wear-resistant coating film, the curing shrinkage occurs vertically to the resinous substrate predominantly. Thus, the present wear-resistant coating film is strongly resistant to cracks and coming-off which result from the curing shrinkage. Therefore, the present wear-resistant coating film is highly adhesive to the resinous substrate.

The thickness of the present wear-resistant coating film depends on the types of the resinous substrate, but can preferably be from 1 to 20 $\mu$m. When the thickness is too thick, the resulting wear-resistant coating films might crack or come off from the resinous substrate because they are likely to be adversely affected by the curing shrinkage greatly. When the thickness is too thin, the resulting wear-resistant coating films might not exhibit sufficient hardness depending on the types of the resinous support.

EXAMPLES

Examples of the present invention as well as comparative examples will be hereinafter described with reference to accompanying Tables 1 and 2.

A layer organic-inorganic composite used in examples and comparative examples were synthesized in the following manner.

Synthesis of Methacrylic Titanosilicate 49.6 g (0.2 mol) 3-methacryloxy propyl trimethoxy silane was added to 500 mL tetrahydrofuran, and the resulting mixture was stirred. Moreover, 28.4 mL titanium isopropoxide was added to the mixture, and the mixture was further stirred. In addition, 18 g ion-exchanged water was added to the mixture. Note that the ion-exchanged water had been diluted with 500 mL methanol. The resulting mixture was dropped into 4,000 mL ion-exchanged water, thereby preparing a suspension. The organic solvents were removed from the suspension with a rotary evaporator. The suspension was condensed until the entire volume was 2,000 mL. Thereafter, the suspension was freeze-dried, thereby collecting 2:1 structure methacrylic titanosilicate.

Note that the used 3-methacryloxy propyl trimethoxy silane was produced by TORAY SILICONE Co., Ltd. and the used titanium isopropoxide was produced by WAKO JUNYAKU Co., Ltd. Moreover, the used methanol was super-high grade methanol produced by WAKO JUNYAKU Co., Ltd., and the used tetrahydrofuran was a dehydrated product for organic syntheses. In addition, the respective reagents were used without refining particularly.

Synthesis of Methacrylic Mg Layer Polymer 20.4 g (0.1 mol) magnesium chloride hexahydrate was solved in 1,000 mL methanol. Thereafter, 49.6 g (0.2 mol) 3-methacryloxy propyl trimethoxy silane was added to the resulting solution. Moreover, an aqueous solution was prepared by mixing 200 mL of 1 mol/L sodium hydroxide aqueous solution with 4,000 mL ion-exchanged water, and was further added to the solution spontaneously. The solution was stirred for 30 minutes. After leaving the solution as it was for 1 day, the solution was filtered by suction. The resulting cake was washed with 2,000 mL water, and was filtered by suction. The cake was vacuum-dried at room temperature for 4 days, thereby synthesizing 2:1 structure methacrylic Mg layer polymer in an amount of 42.8 g.

Note that the used magnesium chloride hexahydrate and methanol were super-high grade magnesium chloride hexahydrate and methanol produced by WAKO JUNYAKU Co., Ltd. Moreover, the used 1 mol/L sodium hydroxide aqueous solution was produced by WAKO JUNYAKU Co., Ltd. for precision analyses, and the used 3-methacryloxypropyl trimethoxy silane was produced by TORAY SILICONE Co., Ltd. In addition, the respective reagents were used without refining particularly.

Synthesis of Acrylic Al Layer Polymer 12.1 g (0.05 mol) aluminum chloride hexahydrate was solved in 100 mL methanol. Thereafter, 23.4 g (0.01 mol) 3-acryloxy propyl trimethoxy silane was added to the resulting solution. Moreover, an aqueous solution was prepared by mixing 13.6 g of 25% by weight ammonia aqueous solution with 1,000 mL ion-exchanged water, and was further added to the solution spontaneously. The solution was stirred for 3 hours. The solution was filtered by suction. Thereafter, the resulting cake was washed with 2,000 mL water, and was filtered by suction. The cake was vacuum-dried at room temperature for 4 days, thereby synthesizing 2:1 structure acrylic Al layer polymer in an amount of 17.8 g.

Note that the used aluminum chloride hexahydrate and methanol were super-high grade magnesium chloride hexahydrate and methanol produced by WAKO JUNYAKU Co., Ltd. Moreover, the used 25% by weight ammonia aqueous solution was produced by WAKO JUNYAKU Co., Ltd. for precision analyses, and the used 3-methacryloxy propyl trimethoxy silane was produced by CHISSO Co., Ltd. In addition, the respective reagents were used without refining particularly.

Comparative Example No. 1

The synthesized methacrylic titanosilicate was mixed with 1-methoxy-2-propanol and α,α'-dimethyl-β-phenyl ethyl alcohol so as to make a composition set forth in Table 1, thereby preparing paint #1. Paint #1 was applied to a transparent polycarbonate plate by a flow-coating method. The transparent polycarbonate plate had a size of 100 mm×100 mm×5 mm. Paint #1 was dried at room temperature for 30 minutes. Thereafter, Paint #1 was irradiated twice with 1,635 mJ/mm$^2$ ultraviolet ray by a high-pressure ultraviolet-ray lamp. Paint #1 was thus cured. The resulting paint film was labeled as coating film #1, and had a thickness of 10 μm.

Comparative Example No. 2

The synthesized methacrylic titanosilicate was mixed with 1-methoxy-2-propanol, tetramethoxy silane and α,α'-dimethyl-β-phenyl ethyl alcohol so as to make a composition set forth in Table 1, thereby preparing paint #2. Paint #2 was applied to and cured on a transparent polycarbonate plate in the same manner as Comparative Example No. 1. Thus, coating film #2 was prepared, and had a thickness of 10 μm.

Example No. 1

The synthesized methacrylic titanosilicate was mixed with 1-methoxy-2-propanol, titanium tetraisopropoxide and α,α'-dimethyl-β-phenyl ethyl alcohol so as to make a composition set forth in Table 1, thereby preparing paint #3. Paint #3 was applied to and cured on a transparent polycarbonate plate in the same manner as Comparative Example No. 1. Thus, coating film #3 was prepared, and had a thickness of 10 μm.

Comparative Example No. 3

The synthesized methacrylic titanosilicate was mixed with 1-methoxy-2-propanol, 3-methacryloxy propyl trimethoxy silane and α,α'-dimethyl-β-phenyl ethyl alcohol so as to make a composition set forth in Table 1, thereby preparing paint #4. Paint #4 was applied to and cured on a transparent polycarbonate plate in the same manner as Comparative Example No. 1. Thus, coating film #4 was prepared, and had a thickness of 10 μm.

Example No. 2

The synthesized methacrylic titanosilicate was mixed with 1-methoxy-2-propanol, tetramethoxy silane, titanium tetraisopropoxide and α,α'-dimethyl-β-phenyl ethyl alcohol so as to make a composition set forth in Table 1, thereby preparing paint #5. Paint #5 was applied to and cured on a transparent polycarbonate plate in the same manner as Comparative Example No. 1. Thus, coating film #5 was prepared, and had a thickness of 10 μm.

Example No. 3

The synthesized methacrylic titanosilicate was mixed with 1-methoxy-2-propanol, titanium tetraisopropoxide, 3-methacryloxy propyl trimethoxy silane and α,α'-dimethyl-β-phenyl ethyl alcohol so as to make a composition set forth in Table 1, thereby preparing paint #6. Paint #6 was applied to and cured on a transparent polycarbonate plate in the same manner as Comparative Example No. 1. Thus, coating film #6 was prepared, and had a thickness of 10 μm.

Comparative Example No. 4

The synthesized acrylic Al layer polymer was mixed with 1-methoxy-2-propanol and α,α'-dimethyl-β-phenyl ethyl alcohol so as to make a composition set forth in Table 1, thereby preparing paint #7. Paint #7 was applied to and cured on a transparent polycarbonate plate in the same manner as Comparative Example No. 1. Thus, coating film #7 was prepared, and had a thickness of 10 μm.

Example No. 4

The synthesized acrylic Al layer polymer was mixed with 1-methoxy-2-propanol, tetramethoxy silane, titanium tetraisopropoxide and α,α'-dimethyl-β-phenyl ethyl alcohol so as to make a composition set forth in Table 1, thereby preparing paint #8. Paint #8 was applied to and cured on a transparent polycarbonate plate in the same manner as Comparative Example No. 1. Thus, coating film #8 was prepared, and had a thickness of 10 μm.

Comparative Example No. 5

The synthesized methacrylic Mg layer polymer was mixed with 1-methoxy-2-propanol and α,α'-dimethyl-β-phenyl ethyl alcohol so as to make a composition set forth in Table 1, thereby preparing paint #9. Paint #9 was applied to and cured on a transparent polycarbonate plate in the same manner as Comparative Example No. 1. Thus, coating film #9 was prepared, and had a thickness of 10 μm.

Example No. 5

The synthesized methacrylic Mg layer polymer was mixed with 1-methoxy-2-prpoparnol, tetramethoxy silane, titanium tetraisopropoxide and α,α'-dimethyl-β-phenyl ethyl alcohol so as to make a composition set forth in Table 1, thereby preparing paint #10. Paint #10 was applied to and cured on a transparent polycarbonate plate in the same manner as Comparative Example No. 1. Thus, coating film #10 was prepared, and had a thickness of 10 μm.

TABLE 1

|  | Comp. Ex. No. 1 Paint #1 | Comp. Ex. No. 2 Paint #2 | Ex. No. 1 Paint #3 | Comp. Ex. No. 3 Paint #4 | Ex. No.2 Paint #5 | Ex. No. 3 Paint #6 | Comp. Ex. No. 4 Paint #7 | Ex. No. 4 Paint #8 | Comp. Ex. No. 5 Paint #9 | Ex. No. 5 Paint #10 |
|---|---|---|---|---|---|---|---|---|---|---|
| Methacrylic titanosilicate | 20 | 20 | 20 | 20 | 20 | 20 | None | None | None | None |
| Acrylic Al layer polymer | None | None | None | None | None | None | 20 | 20 | None | None |
| Methacrylic Mg layer polymer | None | None | None | None | None | None | None | None | 20 | 20 |
| 1-methoxy-2-propanol | 80 | 80 | 80 | 80 | 80 | 80 | 80 | 80 | 80 | 80 |
| Tetramethoxy silane | None | 2 | None | None | 1 | None | None | 1 | None | 1 |
| Titanium tetraisopropoxide | None | None | 2 | None | 1 | 1 | None | 1 | None | 1 |
| 3-methacryloxy propyl trimethoxy silane | None | None | None | 2 | None | 1 | None | None | None | None |
| α,α'-dimethyl-β-phenyl ethyl alcohol | 0.1 | 0.1 | 0.1 | 0.1 | 0.1 | 0.1 | 0.1 | 0.1 | 0.1 | 0.1 |

Note:
The composition proportions are set forth in parts by weight.

Assessment

Coating films #1 through #10 were examined for the superficial hardness based on the wear resistance test set forth in paragraph 7.7 of standard No. JASO M 330, "Rigid Plastic Glazing Materials for Automobile," by the Japanese Automobile Standard organizations. In paragraph (4), the procedure of the wear resistance test, subparagraph (4.6) prescribes "a sample shall be placed on a rotary table of a wear testing machine so that a surface of the sample to be exposed outside vehicle is worn by the wearing rollers of the wear testing machine. A load of 4.90 N (500 gf) shall be applied to the wearing rollers. Then, the sample shall be rotated to wear off by 100 revolutions." However, when assessing coating films #1 through #10, the samples were rotated by 200 revolutions. Note that the used Taber wear testing machine and haze meter were produced by SUGA TESTING MACHINE Co., Ltd. Table 2 below sets forth the results of the wear resistance test.

TABLE 2

|  | Comp. Ex. No. 1 Coating film #1 | Comp. Ex. No. 2 Coating film #2 | Ex. No. 1 Coating film #3 | Comp. Ex. No. 3 Coating film #4 | Ex. No. 2 Coating film #5 | Ex. No. 3 Coating film #6 | Comp. Ex. No. 4 Coating film #7 | Ex. No. 4 Coating film #8 | Comp. Ex. No. 5 Coating film #9 | Ex. No. 5 Coating film #10 |
|---|---|---|---|---|---|---|---|---|---|---|
| Initial Haze $H_0$ | 0.3 | 0.2 | 0.2 | 0.3 | 0.2 | 0.1 | 0.3 | 0.3 | 0.5 | 0.4 |

TABLE 2-continued

|  | Comp. Ex. No. 1 Coating film #1 | Comp. Ex. No. 2 Coating film #2 | Ex. No. 1 Coating film #3 | Comp. Ex. No. 3 Coating film #4 | Ex. No. 2 Coating film #5 | Ex. No. 3 Coating film #6 | Comp. Ex. No. 4 Coating film #7 | Ex. No. 4 Coating film #8 | Comp. Ex. No. 5 Coating film #9 | Ex. No. 5 Coating film #10 |
|---|---|---|---|---|---|---|---|---|---|---|
| Post-wear Haze $H_1$ | 20.2 | 10.6 | 5.0 | 17.0 | 4.1 | 5.2 | 22.3 | 5.2 | 26.6 | 9.6 |
| $\Delta H$ (= $H_1 - H_0$) | 19.9 | 10.4 | 4.8 | 16.7 | 3.9 | 5.1 | 22.0 | 4.9 | 26.1 | 9.2 |

Note:
The post-wear hazes $H_1$ are the haze values after the samples were rotated on the Taber wear testing machine by 200 revolutions.

In Example Nos. 1, 2 and 3, coating films #3, #5 and #6 were prepared by curing paints #3, #5 and #6 in which titanium tetraisopropoxide (i.e., titanium alkoxide) was added to the synthesized methacrylic titanosilicate. In Comparative Example No. 1, coating film #1 was prepared by curing paint #1 in which no titanium tetraisopropoxide was added to the synthesized methacrylic titanosilicate. In Comparative Example Nos. 2 and 3, coating films #2 and #4 were prepared by curing paints #2 and #4 in which tetramethoxy silane or 3-methacryloxy propyl trimethoxy silane was added to the synthesized methacrylic titanosilicate instead of titanium tetraisopropoxide. Accordingly, as can be understood from Table 2, coating films #3, #5 and #6 according to Example Nos. 1, 2 and 3 exhibited a smaller haze-value increment ΔH after the wear resistance test than coating films #1, #2 and #4 according to Comparative Example Nos. 1, 2 and 3 did. Thus, it was confirmed that coating films #3, #5 and #6 according to Example Nos. 1, 2 and 3 had a higher hardness than coating films #1, #2 and #4 according to Comparative Example Nos. 1, 2 and 3 did. Moreover, among coating films #1 through #6, coating film #5 according to Example No. 2 exhibited the least haze-vale increment ΔH. Note that coating film #5 was prepared by curing paint #5 in which not only titanium tetraisopropoxide but also tetramethoxy silane (i.e., an alkoxy silane compound) were added to the synthesized methacrylic titanosilicate.

Moreover, coating films #7, #8, #9 and #10 were examined for the superficial hardness. In coating films #7, #8, #9 and #10, note that the synthesized acrylic Al layer polymer or methacrylic Mg layer polymer was used as the layer organic-inorganic composite instead of the synthesized methacrylic titanosilicate, and that titanium tetraisopropoxide and tetramethoxy silane were added or they were not added. Specifically, in Example Nos. 4 and 5, coating films #8 and #10 were prepared by curing paints #8 and #10 in which titanium tetraisopropoxide and tetramethoxy silane were added to the synthesized acrylic Al layer polymer or methacrylic Mg layer polymer. In Comparative Example Nos. 4 and 5, coating films #7 and #9 were prepared by curing paints #7 and #9 in which titanium tetraisopropoxide and tetramethoxy silane were not added to the synthesized acrylic Al layer polymer or methacrylic Mg layer polymer. Accordingly, as can be understood from Table 2, coating films #8 and #10 according to Example Nos. 4 and 5 exhibited a smaller haze-value increment ΔH after the wear resistance test than coating films #7 and #9 according to Comparative Example Nos. 4 and 5 did. Thus, it was confirmed that coating films #8 and #10 according to Example Nos. 4 and 5 had a higher hardness than coating films #7 and #9 according to Comparative Example Nos. 4 and 5 did.

Moreover, it was not observed that the particle components precipitated from the solvents even when 3 months and 6 months passed after the synthesized methacrylic titanosilicate and methacrylic Mg layer polymer were processed into the respective paint compositions. In addition, it was confirmed possible to form flat coating films by using not only the 3-month-old paint compositions but also the 6-month-old paint compositions.

Having now fully described the present invention, it will be apparent to one of ordinary skill in the art that many changes and modifications can be made thereto without departing from the spirit or scope of the present invention as set forth herein including the appended claims.

What is claimed is:

1. A paint composition, comprising:
    a layer organic-inorganic composite; and
    titanium alkoxide in an amount of from 1 to 50 parts by weight with respect to the layer organic-inorganic composite taken as 100 parts by weight;
    the layer organic-inorganic composite composed of a laminated substance comprising:
        a tetrahedral structural layer made of tetrahedral structures whose central atom M' is Si or a first metallic atom substituting for a part the Si, at least a part of the central atom M' covalent-bonded to an organic group R involving or free from a polymerizable functional group; and
        an octahedral structural layer made of octahedral structures whose central atom M is a second metallic atom; and
    the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$.

2. The paint composition set forth in claim 1, wherein the first metallic atom substituting for a part of the Si and making the central atom M' is at least one atom selected from the group consisting of Al, Fe, P and Ti.

3. The paint composition set forth in claim 1, wherein the central atom M is at least one atom selected from the group consisting of Mg, Al, Ni, Co, Cu, Mn, Fe, Li, V, Zr and Ti.

4. The paint composition set forth in claim 1 further comprising at least one member selected from the group consisting of organic solvents and curing catalysts.

5. The paint composition set forth in claim 1 further comprising an alkoxy silane compound.

6. The paint composition set forth in claim 4 comprising an organic solvent in an amount of from double to 10 times of the weight of the layer organic-inorganic composite.

7. A process for producing a wear-resistant coating film, comprising the steps of:
preparing a paint composition comprising:
a layer organic-inorganic composite; and
titanium alkoxide in an amount of from 1 to 50 parts by weight with respect to the layer organic-inorganic composite taken as 100 parts by weight;
the layer organic-inorganic composite composed of a laminated substance comprising:
a tetrahedral structural layer made of tetrahedral structures whose central atom M' is Si or a first metallic atom substituting for a part the Si, at least a part of the central atom M' covalent-bonded to an organic group R involving or free from a polymerizable functional group; and
an octahedral structural layer made of octahedral structures whose central atom M is a second metallic atom; and
the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$;
coating the paint composition on a surface of a resinous substrate; and
forming a wear-resistant coating film by giving a physical stimulus to the paint composition to cause the paint composition to react and cure.

8. The process set forth in claim 7, wherein the first metallic atom substituting for a part of the Si and making the central atom M' is at least one atom selected from the group consisting of Al, Fe, P and Ti.

9. The process set forth in claim 7, wherein the central atom M is at least one atom selected from the group consisting of Mg, Al, Ni, Co, Cu, Mn, Fe, Li, V, Zr and Ti.

10. The process set forth in claim 7, wherein the paint composition further comprises at least one member selected from the group consisting of organic solvents and curing catalysts.

11. The process set forth in claim 7, wherein the paint composition further comprises an alkoxy silane compound.

12. The process set forth in claim 7, wherein the resinous substrate is composed of polycarbonate.

13. The process set forth in claim 7, wherein the physical stimulus is at least one stimulus selected from the group consisting of heating and emitting ultraviolet rays.

14. A wear-resistant coating film, comprising:
a paint composition coated on a surface of a resinous substrate, and comprising:
a layer organic-inorganic composite; and
titanium alkoxide in an amount of from 1 to 50 parts by weight with respect to the layer organic-inorganic composite taken as 100 parts by weight;
the layer organic-inorganic composite composed of a laminated substance comprising:
a tetrahedral structural layer made of tetrahedral structures whose central atom M' is Si or a first metallic atom substituting for a part the Si, at least a part of the central atom M' covalent-bonded to an organic group R involving or free from a polymerizable functional group; and
an octahedral structural layer made of octahedral structures whose central atom M is a second metallic atom; and
the layer organic-inorganic composite expressed by a general formula, $\{R_nM'O_{(4-n)/2}\}_x(MO_{z/2})(H_2O)_w$, wherein n is an integer of from 1 to 3, x is from 0.5 to 2.0, z is the valence number of the central atom M and is an integer of from 2 to 4, and w is the number of crystal water molecules and is an integer falling in a range of from $\{(z/2)-1\}$ to $(z+1)/2$; and
the wear-resistant coating film further comprising:
organic cross-links formed by polymerization of the polymerizable functional groups of the layer organic-inorganic composite and the polymerizable functional groups of the other layer organic-inorganic composites neighboring the layer organic-inorganic composite, the polymerization induced by a physical stimulus given to the paint composition; and
inorganic cross-links formed by a reaction between the titanium alkoxide, reacted with and bonded to end hydroxide groups of at least one of the tetrahedral structures and octahedral structures of the layer organic-inorganic composite, and the other titanium alkoxides, reacted with and bonded to end hydroxide groups of at least one of the tetrahedral structures and octahedral structures of the other layer organic-inorganic composites neighboring the layer organic-inorganic composite, the reaction induced by the physical stimulus given to the paint composition.

15. The wear-resistant paint film set forth in claim 14, wherein the first metallic atom substituting for a part of the Si and making the central atom M' is at least one atom selected from the group consisting of Al, Fe, P and Ti.

16. The wear-resistant paint film set forth in claim 14, wherein the central atom M is at least one atom selected from the group consisting of Mg, Al, Ni, Co, Cu, Mn, Fe, Li, V, Zr and Ti.

17. The wear-resistant paint film set forth in claim 14, wherein the paint composition further comprises at least one member selected from the group consisting of organic solvents and curing catalysts.

18. The wear-resistant paint film set forth in claim 14, wherein the paint composition further comprises an alkoxy silane compound.

19. The wear-resistant paint film set forth in claim 14, wherein the resinous substrate is composed of polycarbonate.

20. The wear-resistant paint film set forth in claim 14, wherein the physical stimulus is at least one stimulus selected from the group consisting of heating and emitting ultraviolet rays.

* * * * *

UNITED STATES PATENT AND TRADEMARK OFFICE
CERTIFICATE OF CORRECTION

| | | |
|---|---|---|
| PATENT NO. | : 7,009,021 B2 | Page 1 of 1 |
| APPLICATION NO. | : 10/629016 | |
| DATED | : March 7, 2006 | |
| INVENTOR(S) | : Masaaki Tani et al. | |

It is certified that error appears in the above-identified patent and that said Letters Patent is hereby corrected as shown below:

Title Page #54

In the Specification Col. 1, line 2

Title, please delete "PROCES" and insert therefore --PROCESS--;

Column 16, line 11, please delete "1-methoxy-2-prpoparnol" and insert therefore --1-methoxy-2-propanol--;

Signed and Sealed this

Seventeenth Day of April, 2007

JON W. DUDAS
*Director of the United States Patent and Trademark Office*